United States Patent [19]

Merkl

[11] 4,117,099

[45] Sep. 26, 1978

[54] HYDROSULFIDE-GROUPS CONTAINING MULTI-METAL INORGANIC POLYMERIC COMPLEX AND METHOD OF MAKING SAME

[76] Inventor: George G. Merkl, 46 Sunset Ct., Haworth, N.J. 07641

[21] Appl. No.: 748,416

[22] Filed: Dec. 8, 1976

[51] Int. Cl.$^2$ .................... C01B 17/00; C01B 17/32; B01J 27/02

[52] U.S. Cl. .................................. 423/511; 423/560; 252/439

[58] Field of Search ................. 252/439; 423/511, 560

[56] References Cited

U.S. PATENT DOCUMENTS

3,551,352  12/1970  Carr et al. ............................. 252/439

Primary Examiner—Delbert E. Gantz
Assistant Examiner—William G. Wright

[57] ABSTRACT

Novel water soluble inorganic multi-metal polymeric complexes are obtained by reacting, in the presence of a sulfur containing compound convertable to hydrosulfide groups under the conditions prevailing in the aqueous reaction medium, at least one non-alkaline metal selected from Groups I to VIII of the Periodic Table with an alkali metal hydroxide. In one embodiment, an excess of the non-alkaline metal or metals is introduced into a reaction vessel, already containing an aqueous solution of the alkali metal hydroxide, and the sulfur containing compound is thereafter incrementally added. In another embodiment, the alkali metal hydroxide and sulfur containing compound are each incrementally added to the reaction medium. The inorganic multi-metal polymeric complexes produced by this reaction have valuable utility in the plating of metals and in the removal of sulfur dioxide and other pollutants from effluent gas streams.

25 Claims, 12 Drawing Figures

HYDROSULFIDE-GROUPS CONTAINING MULTI-METAL INORGANIC POLYMERIC COMPLEX AND METHOD OF MAKING SAME

SUMMARY OF THE INVENTION

The present invention is directed to a method for the production of heretofore unknown inorganic multi-metal polymeric complexes containing a plurality of hydrosulfide groups and to the aqueous solutions containing the same.

In accordance with the present invention, the inorganic multi-metal polymeric complexes containing a plurality of hydrosulfide groups can be prepared, either through an alkaline reaction or acidic reaction. The particular reaction which is selected will depend primarily upon the metal system employed, specifically whether the non-alkaline metal utilized in the method is one which dissolves more readily in an alkaline or acidic environment. Where the particular metal does not dictate the use of one or the other reaction, it is preferred in accordance with the present invention to carry out the reaction in an alkaline environment since this reaction is more susceptible to easy control and also promotes the development of hydride formation within the polymeric complex.

The essential reactants to produce the inorganic multi-metal polymeric complexes containing a plurality of hydrosulfide groups are: at least one non-alkaline metal of Group I–VIII of the Periodic Table; an alkali metal hydroxide; and a sulfur-containing compound which is capable of conversion to hydrosulfide groups under the conditions prevailing in the the aqueous reaction medium. While this last reactant can be broadly selected from a variety of sulfur-containing compounds, preferred sulfur-containing compounds are $SO_2$ gas, $H_2S$ gas and/or elemental sulfur. Other sources such as sulfates, sulfonates, etc. can also be employed. Accordingly, the expression "sulfur-containing compound capable of conversion to hydrosulfide groups under the conditions prevailing in the aqueous reaction medium" is meant to embrace any or all of the above and similar sulfur-containing compounds, the mechanism for conversion to the hydrosulfide groups and the utilization thereof in the production of the multi-metal inorganic polymeric complexes of the present invention being explained hereinafter.

In the preferred embodiment of the present invention wherein the reaction is carried out in an alkaline reaction medium, a predetermined quantity of the non-alkaline metal is first introduced into a reaction vessel containing the aqueous reaction medium. A supply of alkali metal hydroxide is provided in the aqueous medium to provide an alkaline environment for carrying out the reaction, preferably a pH in the aqueous reaction medium of from about 11 to about 14. The desired sulfur-containing compound is incrementally introduced into the aqueous medium whereby the sulfur-containing compound is converted to hydrosulfide groups which react with dissolved metal ions of the non-alkaline metal and the alkali metal. The rate of such incremental introduction of the sulfur-containing compound should correspond approximately proportionally to the rate of dissolution of the non-alkaline metal such that the hydrosulfide groups which are formed are tied up and bound up with dissolved non-alkaline metal and alkali metal ions, thereby forming the inorganic multi-metal polymeric complex containing a plurality of hydrosulfide groups. This incremental introduction of the sulfur-containing compound will effect a slow reduction of the pH of the aqueous medium in two ways: first, and obviously, because of the addition of hydrogen ions to the reaction solution by the normally acidic sulfur-containing compound and, second, through the reduction of available hydroxide groups as the alkali metal is taken up into the reaction product along with the sulfur and hydrogen. It is important to note that the incremental charge of the reactants should be controlled such that the latter effect predominates.

Preferably, in accordance with this embodiment of the present invention, the incremental introduction of the sulfur-containing compound is stopped when the pH of the aqueous medium reaches a pH of from about 8.5 to about 10.5. The reaction is stopped and the desired product recovered in the form of an aqueous solution of the inorganic polymeric complex by removing any unreacted non-alkaline metal when the pH of the aqueous medium reaches a pH of about 6.5 to about 7.5.

Additional sulfur can be introduced into the inorganic polymeric complexes of the present invention by the further addition of elemental sulfur to the reaction medium prior to or subsequent to removal of unreacted non-alkaline metal. It appears that the elemental sulfur is absorbed or taken up by the hydrosulfide groups in the inorganic polymeric complex as it forms.

In the alternative embodiment of the present invention, carried out in an acidic environment, both the alkali metal hydroxide and sulfur-containing compound are incrementally introduced into the aqueous reaction medium so as to maintain an acidic pH, preferably a pH therein of from about pH 2.5 to about pH 6.0. Where this addition is carried out in the manner described more fully herein, the sulfur-containing compound is converted under the conditions prevailing in the aqueous reaction medium to hydrosulfide groups which react with dissolved ions of the non-alkaline metal and alkali metal hydroxide to produce the inorganic multi-metal polymeric complex containing a plurality of hydrosulfide groups in accordance with the present invention. In this embodiment, the incremental introduction of the sulfur-containing compound and alkali metal hydroxide is preferably stopped when the pH of the aqueous medium reaches a pH of from about 5.0 to about 6.0 and the reaction is terminated by removal of unreacted non-alkaline metal when the pH of the aqueous medium reaches a pH of about 6.0 to about 7.0.

The method of the present invention for the production of the inorganic polymeric complexes is exothermic in nature and can be readily carried out under ambient conditions of temperature and pressure. It is preferred, however, to maintain the temperature of the reaction within the range of about 20° C. to about 70° C. and under certain circumstances, more effective production of the inorganic polymeric complex can be achieved by carrying out the reaction under slightly elevated pressures. In addition, under certain circumstances agitation of the reaction vessel may be utilized to achieve the greatest contact between reactants in the production of the inorganic polymeric complex.

Adequate contact between the sulfur-containing compound and dissolving non-alkaline metal is necessary to assure production of the inorganic polymeric complex. In the most preferred embodiment of the present invention utilizing as the sulfur-containing compound $SO_2$ gas and/or $H_2S$ gas, this can be effectively achieved by bubbling such gaseous reactant directly into the aqueous reaction medium so that the gas bubbles emerge in the vicinity of the non-alkaline metal and, most preferably, impinge upon the non-alkaline metal present in the aqueous reaction medium.

Adherence to the above parameters will provide for the production of the inorganic polymeric complexes with a minimum of undesirable salt formation. In order to eliminate or prevent salt formation to the greatest possible degree, it is preferred in accordance with the present invention to reduce as much as possible the available oxygen present in the aqueous reaction medium. When $SO_2$ gas is employed as the sulfur-containing compound, the $SO_2$ gas introduces oxygen into the aqueous reaction medium. Accordingly, it is preferred when utilizing $SO_2$ gas to conjointly utilize hydrogen sulfide gas. The presence of the $H_2S$ gas within the aqueous reaction medium will serve not only to remove oxygen present in the system which might otherwise tend to form sulfates and similar salts, but also to provide additional elemental sulfur to the reaction. Of course, as indicated previously, $H_2S$ gas can be utilized alone as the sulfur-containing compound in the production of the inorganic polymeric complexes of the present invention. In addition, as will be explained hereinafter, when aluminum is employed as the non-alkaline metal, a specific activated form of aluminum can be employed, which activated form of aluminum also tends to reduce the available oxygen and eliminate or reduce the degree of salt formation which might otherwise occur when utilizing $SO_2$ gas.

Those skilled in the art will appreciate that some non-alkaline metals of Groups I–VIII of the Periodic Table will naturally dissolve in the aqueous alkaline or acidic medium. As to these metals, the above described embodiments proceed easily without the application of external sources for promoting the reaction. However, where the particular metal utilized does not dissolve easily in the reaction medium, it may be advantageous under certain circumstances to promote the reaction in one or more ways.

For example, an increase in the reaction rate can be achieved through one or more of the following:
  gently heating the reaction medium to assist dissolution of the non-alkaline metal;
  providing for an increase in the effective surface area of the metal or metals which is available to react with the alkali metal hydroxide and sulfur-containing compound; and
  depolarizing the surface area of the non-alkaline metal or metals to increase hydroxyl attack and dissolution of these metal or metals.

Preferably, to assist dissolution of the non-alkaline metal and to accelerate the reaction the reaction medium is heated to at least about 50° C.

The hydrosulfide group containing multi-metal inorganic polymeric complexes of the present invention can be utilized in a variety of ways. It has been determined that aqueous solutions of the inorganic polymeric complexes can be effectively employed in the plating of metals. Such aqueous solutions also find utility in environmental pollution control in the removal of sulfur dioxide and other pollutants from effluent gas streams.

BRIEF DESCRIPTION OF THE DRAWINGS

FIGS. 2 (A–C) are portions of a mass spectrograph scan of the polymeric complex of FIG. 1 and made at the time of the thermogravimetric analysis depicted in FIG. 1;

FIGS. 3 (A–D) together are a Raman spectrograph of an aluminum-sodium-sulfur polymeric complex produced by the practice of the present invention.

DESCRIPTION OF PREFERRED EMBODIMENTS

The method of the present invention for the production of the inorganic polymeric complexes is carried out totally in an aqueous reaction medium. As a result, the inorganic polymeric complexes are produced as an aqueous solution. For most applications, it will be unnecessary to separate the complex polymeric product from the aqueous solution. This is because the important utilities contemplated for the products of the present invention, for example, in the plating of metals or in scrubbing certain gaseous pollutants, such as $SO_2$ and/or $H_2S$, from effluent gas streams contemplate use in aqueous solution form.

To prepare the inorganic polymeric complexes of the present invention the following reactants are required:
  (a) at least one non-alkaline metal selected from Groups I–VIII of the Periodic Table;
  (b) an alkali metal hydroxide; and
  (c) a sulfur-containing compound which is capable of conversion to hydrosulfide groups under the conditions prevailing in the aqueous reaction medium.
These reactants are individually discussed below.

The Non-Alkaline Metal

In the method of the present invention, the metal reactant may be any non-alkaline metal of Groups I–VIII of the Periodic Table. Representative, non-limiting examples of applicable non-alkaline metals include:
  Group I-B: copper, silver, gold
  Group II-A: beryllium, magnesium
  Group II-B: zinc, cadmium
  Group III-A: aluminum, gallium, indium
  Group IV-A: silicon, tin, lead
  Group IV-B: titanium, zirconium, hafnium
  Group V-A: antimony, bismuth
  Group V-B: vanadium, niobium, tantalum
  Group VI-A: selenium, tellurium
  Group VI-B: chromium, molybdenum, tungsten
  Group VII-B: manganese
  Group VIII: iron, cobalt, nickel, palladium rhodium It should be recognized that while silicon, as a member of Group IV-A, is not generally defined as a metallic element, silicon acts in the method of the present invention as a non-alkaline metal. Accordingly, the expression "non-alkaline metal of Groups I–VIII of the Periodic Table" is meant to embrace any and all of the above and equivalent metals, including silicon. As will be further recognized, the term "non-alkaline metal of Groups I–VIII of the Periodic Table" does not embrace the alkali metals of Group I-A. The alkaline earth metals, calcium, strontium, and barium of Group II-A, are similarly not within the scope of the term. On the other hand, beryllium and magnesium of Group II-A can be applicably employed in the practice of this invention and these metals also fall within the scope of the expression "non-alkaline metal of Groups I–VIII of the Periodic Table" as used throughout this specification.

In addition to a single non-alkaline metal, as defined above, the metal reactant of the present invention can advantageously comprise two or more such non-alkaline metals. As indicated previously, non-alkaline metals applicable include those metals of Groups I–VIII of the Periodic Table which can be dissolved either in the aqueous alkaline solution or acidic solution, or in either environment in the presence of the sulfur-containing compound.

In broad terms, it may be stated that the reaction dynamics of the present invention are related to the available surface area of the non-alkaline metal. Thus, where the non-alkaline metal is in the form of extremely large chunks, there may be insufficient surface area per unit weight of non-alkaline metal for adequate dissolution and reaction in accordance with the method of the present invention. In such a case, or where the metal dissolves slowly and/or is otherwise difficult to react, it is often advisable to increase the available surface area, such as by decreasing the particle size of the non-alkaline metal. Care must be taken, however, not to provide a particle size which causes metal dissolution to take place too rapidly. On the other hand, with some metals, a decrease in the particle size of the non-alkaline metal can actually decrease the reaction dynamics. This latter effect appears to occur due to polarization between the metal particles, not only at the surface of the particulate metal but also within the mass of metal particles. This has the effect of reducing the available hydrogen for metal dissolution.

When aluminum is employed as the non-alkaline metal, an activated aluminum can also be used to form the inorganic, polymeric complex of the present invention. As used herein, activated aluminum means an aluminum, of at least 99.9% purity, that has been activated with mercury, gallium or an alloy of gallium and indium in the presence of a source of $H^+$ ions, according to the procedure disclosed in Applicant's U.S. Pat. No. 3,993,595 issued Nov. 23, 1976, such patent being incorporated herein by reference for all purposes. When using the activated aluminum, it is preferred, for the present invention, to use aluminum activated with mercury.

For any particular non-alkaline metal or combination of non-alkaline metals or activated aluminum, the selection of size and/or shape of the metallic pieces can be easily determined by one skilled in the art, based upon an observation of reaction dynamics. In general, however, on a laboratory scale it has been found that a particle size of from about ⅛ inch to 1 inch in diameter for non-alkaline metal shot or sponge is particularly effective in achieving the advantageous results of the present invention. Of course, the method of the present invention can be carried out with equal efficiency using wire, foils, rods or other convenient forms and shapes (including powders which can be used if care is taken to control the reaction).

The Alkali Metal Hydroxide

The alkali metal hydroxide utilized as the second reactant in the method of the present invention can comprise any hydroxide of a metal of Group I-A of the Periodic Table, principally, sodium hydroxide, potassium hydroxide or lithium hydroxide. As will be explained in more detail hereinafter in connection with the discussion of reaction parameters, the alkali metal ions supplied to the reaction medium by the hydroxide enter into reaction and form a component of the inorganic polymeric complex produced by the reaction.

With respect to those non-alkaline metals which dissolve in an alkaline environment, it should be clear that the alkali metal hydroxide assists in dissolution of these metals. In addition, however, even when considering the reaction which is carried out in the acidic environment the alkali metal hydroxide by incorporation into the structure of the inorganic polymeric complex adds strength and stability to the hydrosulfide group containing inorganic multi-metal polymeric complex, which strength and stability could not be achieved absent the presence of the alkali metal and non-alkaline metal within the polymeric complex structure.

The preferred alkali metal hydroxide in accordance with the present invention is sodium hydroxide or potassium hydroxide, with potassium hydroxide being most preferred.

While not favored in the practice of the method of the present invention, it should be recognized that under certain circumstances all or a portion of the alkali metal hydroxide may be replaced with one of the alkaline earth metal hydroxides. The alkali metal hydroxide, specifically sodium hydroxide or potassium hydroxide, is preferably employed in the form of a prepared aqueous solution of the alkali metal hydroxide. However, it is possible, where the alkali metal hydroxide is metered into the reaction system, to employ solid pellets of the alkali metal hydroxide.

The Source of Hydrosulfide Groups

Analytical studies have shown that the inorganic polymeric complex produced in the method of the present invention contains a plurality of hydrosulfide groups. Accordingly, the third essential reactant in the method of the present invention comprises a sulfur-containing compound which, under the conditions prevailing in the reaction medium, is converted to such hydrosulfide groups.

In the preferred reaction process, the sulfur-containing compound is chosen from elemental sulfur, $SO_2$ and/or $H_2S$ gas. As indicated previously, however, other equivalent forms of sulfur-containing compounds are applicable in accordance with the present invention.

Reaction Parameters

Reactant Proportions

In the production of the inorganic polymeric complex of the present invention, the ratio of the alkali metal to the non-alkaline metal can be varied within wide limits. For example, such ratio may be varied from about 1:0.5 to 1:10 or more, this ratio being directly proportional to the effective surface area of the non-alkaline metal. For example, where a great surface area exists and there is substantial dissolution of the non-alkaline metal, there will be a greater ratio of non-alkaline metal to alkali metal in the inorganic polymeric complex. Likewise, the amount of alkali metal when compared with the non-alkaline metal will be greater where a small surface area of the non-alkaline metal exists, and as a result, the dissolution rate is less.

Generally, in accordance with the present invention, the non-alkaline metal is employed in an amount in excess based on the desired molar ratio of alkali metal to non-alkaline metal in the inorganic polymeric complex. Since the formation of the inorganic polymeric complex requires the presence of non-alkaline metal for reaction, the reaction can be terminated conveniently at any stage, by simply removing the excess non-alkaline metal from the reaction medium. However, if desired the reaction can be further continued since continued addition of $H_2S$ and/or $SO_2$ gas provides a source of hydrosulfide groups that may be incorporated into the structure of the inorganic polymeric complex or the inorganic polymeric complex may be further loaded with $SO_2$ and/or $H_2S$. Also, the further addition of elemental sulfur, either prior to or subsequent to removal of unreacted non-alkaline metal will have the effect of loading the inorganic polymeric complex with sulfur, either dissolved in or reacted with the inorganic polymeric complex. The addition of such elemental sulfur can also conveniently allow the use of less $SO_2$ and/or $H_2S$ gas, where desired.

As will be explained in greater detail hereinafter, the amount of the sulfur-containing compound employed in the method of the present invention will generally be predetermined based upn the particular alkali and non-alkaline metals utilized. It has been determined that in the inorganic polymeric complex formed in accordance with the present invention, the non-alkaline metal ideally takes its lowest possible valence state (if in fact more than one valence state is possible). It is further believed that in the inorganic polymeric complex of the present invention the number of hydrosulfide groups is ideally equal to the sum of the valences of the alkali metal and non-alkaline metal. From this, therefore, it is possible to determine the amount of the sulfur-containing compound to be introduced into the reaction medium. Due to the inevitable loss of some $SO_2$ and/or $H_2S$ gas, however, it will be desirable to include within the reaction medium an excess amount of the sulfur-containing compound based upon the proposed formulation. This will assure that sufficient hydrosulfide groups will be present to react with the alkali metal and non-alkaline metal in the formation of the inorganic polymeric complex of the present invention.

Reaction Dynamics

The reaction dynamics of the method of the present invention will be described primarily with regard to a model system based upon silicon/sodium or potassium. It should be recognized, however, that the reaction dynamics set forth will be typical of a substantial number of the non-alkaline metals of Group I-VIII of the Periodic Table encompassed within the description given above. The reaction dynamics for any particular metal system or combination of metals can be easily determined by one of ordinary skill in the art through routine experimentation.

In the alkaline medium embodiment of the present invention, in both the silicon/sodium and silicon/potassium system, the silicon metal begins dissolution in an alkaline environment upon the introduction into the reaction vessel of the $H_2S$ and/or $SO_2$ gas. With less reactive metals than silicon, it may be necessary, in order to either initiate, accelerate or maintain the reaction, to provide external heating of the reaction medium. This heating should be carried out in a uniform manner. Heating of the reaction medium to a temperature of at least about 50° C. will generally be satisfactory to develop and accelerate the reaction.

In the alternative, there are other available procedures when utilizing a less reactive non-alkaline metal. For example, as has been explained earlier, since the reactivity of the non-alkaline metal is to some extent a function of the surface area of this non-alkaline metal, increased reactivity can be achieved by increasing the surface area of the non-alkaline metal. This can be done by providing the non-alkaline metal in smaller particle size or in greater amount. Again, however, it should be recognized that care should be taken in utilizing a powdered metal in the method of the present invention. This is due to the fact that in some instances the powdered metal becomes too reactive and the reaction can not be easily controlled. In other instances, a polarization of hydrogen occurs, making the non-alkaline metal even less reactive.

Taking advantage of the fact that the method of the present invention is applicable to so many different metals, a very effective way of increasing the reactivity of the less reactive metals is by including within the reaction system a minor amount of a more reactive metal, such as, silicon, aluminum, gallium, and the like. In this respect, it has been determined that even amounts as small as 0.01% of this more reactive metal can increase the reactivity of a less reactive non-alkaline metal. Of course, since more than one metal is applicable in accordance with the present invention, there is no upper limit in terms of the amount of the more active non-alkaline metal which can be added to the reaction medium. Also, the addition of almost any second non-alkaline metal, even as an impurity in the first non-alkaline metal seems to increase the reactivity of the non-alkaline metal through an anodic reaction.

When increasing the reactivity of a less reactive non-alkaline metal through the addition of a more reactive non-alkaline metal, it has been found advantageous to use as the more reactive metal a non-alkaline metal which has been previously used in a reaction carrying out the method of the present invention. That portion of the non-alkaline metal remaining after carrying out the method of the present invention, upon its removal from the reaction medium, is found to be even more reactive in carrying out further reactions. In fact, since even the less reactive non-alkaline metals become more reactive after being utilized in carrying out the method of the present invention, some of the less reactive non-alkaline metal which has been put through the instant method can be used to accelerate the reactivity of the same non-alkaline metal in future reactions. This procedure would eliminate the possibility of introducing an impurity into the inorganic polymer as a second metal, where no second metal is desired.

With respect to the alkali metal hydroxide, it is emphasized that in addition to the applicability of sodium hydroxide and potassium hydroxide, the process of the present invention is applicable as well to the other alkali metal hydroxides. In addition, as was also indicated previously, all or a portion of the alkali metal hydroxide may be replaced with an alkaline earth metal hydroxide, such as calcium, barium or strontium hydroxide. These alkaline earth metal hydroxides are however, less active than the illustrated alkali metal hydroxides. Because of the rather low activity of these alkaline earth metal hydroxides, their use is not preferred.

To initiate the alkaline medium embodiment of the method of the present invention to produce the inorganic polymeric complex, the non-alkaline metal or metals, such as silicon, is first introduced into a reaction vessel containing water as the reaction medium. In this embodiment of the present invention, the alkali metal hydroxide, such as sodium hydroxide or potassium hydroxide, is thereafter introduced into the aqueous medium containing the non-alkaline metal to establish an alkaline environment, preferably one wherein the pH of the aqueous medium is from about pH 11 to about pH 14.

The sulfur-containing compound is next incrementally introduced into the aqueous reaction medium. In the case of a gas such as $SO_2$ and/or $H_2S$, the gas can be effectively introduced by bubbling the gas directly into the reaction medium. Where elemental sulfur is employed, the elemental sulfur can also be introduced incrementally. In either case, it is important in accordance with the present invention that adequate contact between the sulfur-containing compound and non-alkaline metal be established. In the case of a gas such as $SO_2$ and/or $H_2S$, this can be easily achieved by bubbling the gas directly in the vicinity of the non-alkaline metal.

The dissolution of the non-alkaline metal is accompanied by release of atomic hydrogen. In accordance with the preferred embodiment of the present invention, the introduction of the sulfur-containing compound should be such that it is approximately equimolar in relation to the number of valence electrons released through the dissolving non-alkaline metal. It is these valence electrons which react with the sulfur-containing compound, producing the hydrosulfide groups for introduction into the inorganic polymeric complex of the present invention. Since some valence electrons can, of course, be lost in the form of $H_2$, it is generally necessary to provide in the reaction system an excess amount of the non-alkaline metal.

However, for purposes of more clearly identifying the rate of introduction of the sulfur-containing compound it can be said that such introduction should be approximately proportional to the rate of dissolution of the non-alkaline metal, taking into consideration the number of valence electrons made available through the dissolution of the non-alkaline metal. When this is accomplished, the pH drop of the reaction medium will primarily result from the taking up into the reaction product of the alkali metal, thus tying up the hydroxide, with the reaction, rather than by neutralizing it and producing salt.

When sulfur dioxide is employed alone as the sulfur-containing compound in accordance with the present invention a large excess of the non-alkaline metal may be necessary in the reaction medium in order to supply sufficient valence electrons for reaction with and conversion of the $SO_2$ to the desired hydrosulfide groups. Accordingly excess metal must be dissolved in the reaction medium when $SO_2$ is employed to supply an excess of valence electrons and prevent to the greatest extent possible, the formation of undesirable salts. Such dissolution of an excess of non-alkaline metal, however, is not necessary when $H_2S$ gas is employed as the sulfur-containing compound or combined $H_2S$ and $SO_2$ gas is employed since the $H_2S$ appears to eliminate or tie-up the available oxygen and as a result prevent the undesirable salt formation which might otherwise occur.

Due to the acidic nature of the $SO_2$ and/or $H_2S$, for example and the tying-up of free hydroxyl ions of the alkali metal hydroxide, the incremental introduction of the sulfur-containing compound into the aqueous reaction medium effects a reduction of the pH of the aqueous medium. This slow reduction must be produced since an abrupt lowering of the pH, as through a very quick addition of the sulfur-containing compound at one time, can result in undesirable salt formation and a reduced production of the desired inorganic polymeric complex.

In accordance with the present invention, formation of the inorganic polymeric complex begins as soon as the incremental introduction of the sulfur-containing compound is begun. The percentage of inorganic polymeric complex will initially be quite small, but it will increase proportionately to the amount of sulfur-containing compound introduced and concomitantly the lowering of the pH of the aqueous reaction medium. To obtain the product of this invention, it is merely necessary to incrementally add the sulfur-containing compound so that there is some finite lowering of the pH of the aqueous reaction medium, this being indicative of polymeric complex production.

In order to produce maximum yield of the inorganic polymeric complex of the present invention, the incremental introduction of the sulfur-containing compound is preferably stopped when the pH of the aqueous medium reaches a pH of from about 8.5 to about 10.5. At this stage, any excess unreacted non-alkaline metal can be removed from the aqueous reaction medium. However, in the preferred embodiment of the present invention, the reaction is allowed to continue for some period of time subsequent to termination of the introduction of the sulfur-containing compound and the unreacted non-alkaline metal is removed from the aqueous medium when the pH of the aqueous medium reaches about pH 6.5 to about pH 7.5. Still further, in accordance with an optional embodiment of the present invention, the inorganic polymeric complex which is prepared can be further loaded with sulfur, and/or $SO_2$ for example by further introduction of the appropriate sulfur-containing compound subsequent to or prior to withdrawal of the unreacted excess non-alkaline metal, even to the point of carrying the reaction into the acidic range. One surprising aspect of the inorganic polymeric complex of the present invention is that the hydrosulfide groups remain stable even under acidic conditions. It is the existence of these groups which enables the polymeric complexes to absorb additional sulfur and $SO_2$.

As indicated previously, in an alternative embodiment of the present invention, the alkali metal hydroxide and sulfur-containing compound are both added incrementally into the aqueous reaction medium containing the non-alkaline metal. This reaction is carried out in an acidic medium. This is in lieu of the above described procedure whereby the sulfur-containing compound is incrementally added to the reaction system, already containing the dissolved alkali metal hydroxide. When adding the alkali metal hydroxide incrementally together with sulfur-containing compound, the alkali metal hydroxide can be in the form of an aqueous solution. Preferably, however, the alkali metal hydroxide is in the form of solid pellets of sodium hydroxide or potassium hydroxide. Like the sulfur-containing compound, these solid pellets of alkali metal hydroxide should be added to the reaction system so that intimate contact between the alkali metal hydroxide and non-alkaline metal occurs. This can be achieved by dropping the pellets into the aqueous reaction medium in the vicinity of the non-alkaline metal.

When the simultaneous feed of alkali metal hydroxide and sulfur-containing compound is carried out in accordance with the present invention to produce the inorganic polymeric complex, the feeds of the alkali metal hydroxide and sulfur-containing compound are such as to maintain the pH of the reaction medium acidic, preferably within the range of from about pH 2.5 to about pH 6.0, most preferably pH 3.5 to 4.2.

While the alkali metal hydroxide and sulfur-containing compound are simultaneously added incrementally in accordance with this embodiment of the present invention wherein the reaction is carried out under acidic conditions, it should be recognized that both the alkali metal hydroxide and sulfur-containing compound need not both be continuously added to the reaction medium. In fact, in order to create within the reaction medium the desired pH within the acidic range, it may be necessary to first introduce the sulfur-containing compound, e.g. $SO_2$ and/or $H_2S$ gas prior to any incremental introduction of the alkali metal hydroxide. Additionally, particularly where the alkali metal hydroxide is added to the reaction medium in the form of solid pellets, at the time of introduction of the pellets the pH of the reaction medium may for a short period of time be forced outside of the desirable acidic range described above. As a result, under these circumstances it will be desirable to continue the introduction of the sulfur-containing compound in the absence of continued introduction of the alkali metal hydroxide to again create within the aqueous reaction medium the desired acidic pH. In addition, it is within the scope of the present invention to both continue or discontinue the introduction of the sulfur-containing compound at the time of introduction of the alkali metal hydroxide into the aqueous reaction medium.

All other parameters concerning the alternative embodiment of the present invention are similar to those discussed above in connection with the alkaline method embodiment for producing the inorganic polymeric complex of the present invention.

As was the case with regard to the alkaline reaction embodiment of the present invention, in this acidic reaction embodiment the sulfur-containing compound when introduced into the aqueous reaction medium is converted to hydrosulfide groups through the dissolution of the non-alkaline metal and release of valence electrons, the hydrosulfide groups formed reacting with dissolved ions of the non-alkaline metal and alkali metal hydroxide to produce the inorganic polymeric complex of the present invention.

In a manner similar to the alkaline reaction embodiment described above, the inorganic polymeric complex begins to form as soon as the alkali metal hydroxide is added to and dissolves in the reaction medium. Again the formation of the inorganic polymeric complex will be small initially, but will increase as additional alkali metal hydroxide is added to the reaction medium. To obtain some product, all that is required is that there be some finite increase in the pH of the reaction medium, indicative of inorganic polymeric complex formation. This increased pH, of course, refers to the overall pH of the system under stabilized conditions, discounting localized high pH in the vicinity of introduction of the alkali metal hydroxide.

In accordance with this acidic reaction embodiment, the incremental introduction of the sulfur-containing compound and/or alkali metal hydroxide is preferably stopped when the pH of the aqueous reaction medium reaches a pH of about 5.0 to about 6.0 so as to maximize inorganic polymeric complex production. In the preferred method of carrying out this embodiment, the unreacted non-alkaline metal is removed from the aqueous medium when the pH of the aqueous medium reaches a pH of about 6.0 to about 7.0. Again, as was the case with regard to the alkaline environment embodiment, additional loading of the inorganic polymeric complex with sulfur and/or $SO_2$ and/or $H_2S$ can be advantageously carried out either prior to or subsequent to removal of the unreacted non-alkaline metal.

As a general rule, the reaction to produce the inorganic polymeric complex of the present invention, regardless of which of the above methods is utilized, is exothermic in nature. Accordingly, as the reaction proceeds and the inorganic polymeric complex is formed, heat will build up within the reaction medium. It is preferred in accordance with the present invention to maintain the reaction medium within a temperature range of from about 20° C. to about 70° C.

In actual practice, the method of the present invention can be advantageously carried out up to the boiling point of the aqueous reaction medium if care is taken to control the reaction, as through the controlled introduction of the reactants. However, due to the exothermic nature of the reaction and the potential for an uncontrolled system, it is preferred to maintain the reaction temperature within the above-specified range.

It may be necessary under certain circumstances to provide a suitable means for withdrawal of heat from the reaction medium. This can be successfully achieved, for example, by utilizing a simple ice bath, etc. Moreover, since there is inevitably some loss of the gaseous $SO_2$ and/or $H_2S$ from the reaction system, it is often advantageous to employ reflux conditions so as to maintain as much as possible of this gaseous reactant in contact with the aqueous medium and non-alkaline metal. This assures the best utilization of this reactant and the greatest assurance that sufficient contact will be maintained between the sulfur-containing compound and dissolving non-alkaline metal so as to effect the production of the desired inorganic polymeric complex.

As indicated above, while it is a general rule that the reaction is exothermic in nature, with certain metals, an endothermic reaction may in fact be created in the reaction system. Under these circumstances, it may be necessary to accelerate the reaction by gently heating the reaction medium during the course of the inorganic polymeric complex production. Again, it is preferred to initiate the reaction under certain circumstances by heating the reaction medium to a temperature of at least about 50° C.

CHEMICAL ANALYSIS OF THE POLYMERIC COMPLEXES OF THE PRESENT INVENTION

In order to further study the polymeric complex produced by the practice of the present invention, typical complexes were subjected to thermogravimetric analysis (TGA), mass spectroscopy (MS) and viscosity measurements.

Figure 1:
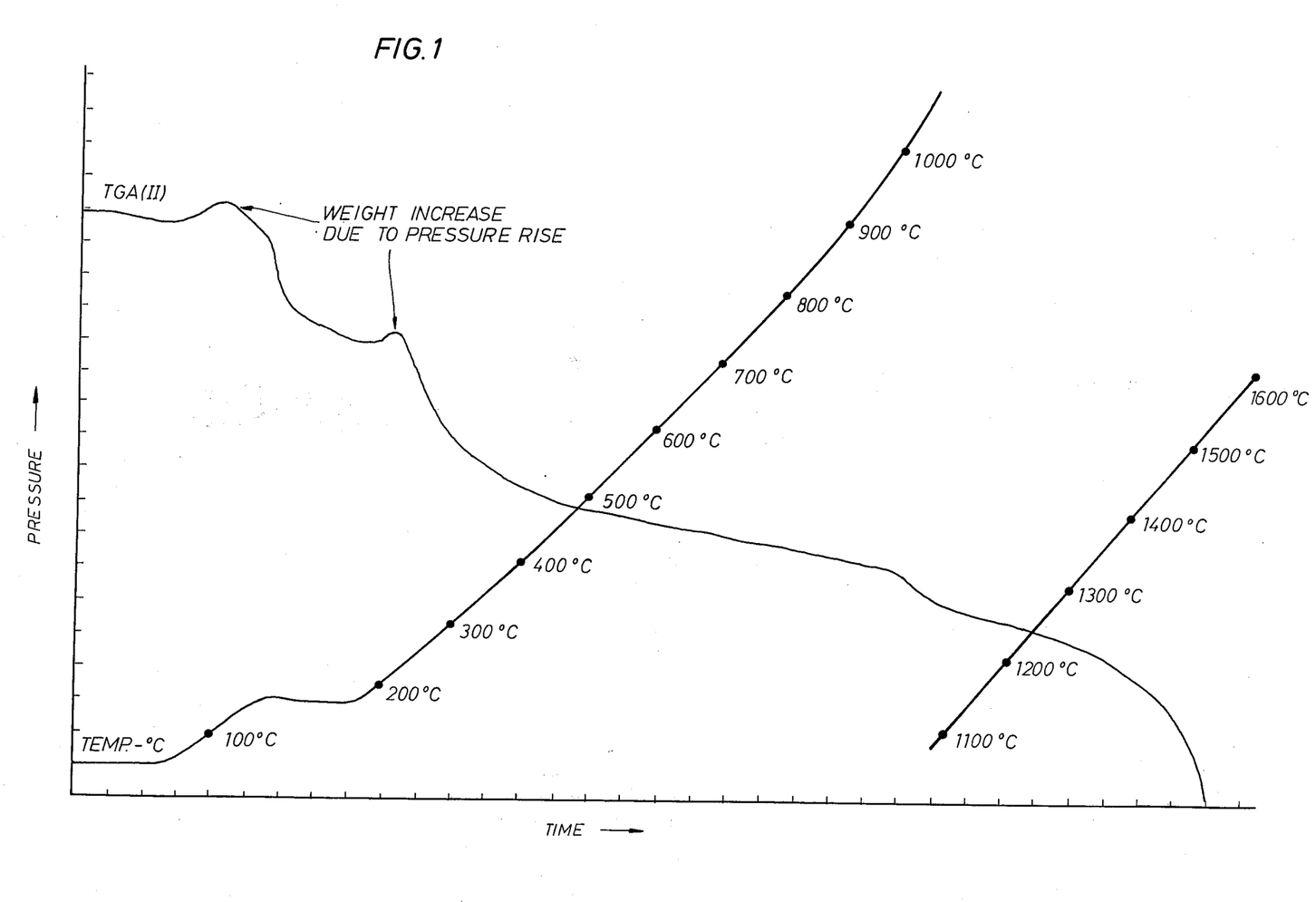
FIG. 1 is a thermogravimetric analysis thermograph made of a silicon-potassium-sulfur polymer produced by the practice of the present invention.

Referring to FIG. 1, which is a TGA thermograph of a silicon-potassium-sulfur polymeric complex produced by the practice of this invention, one notes that four reactions occur during the heating process. These reactions are observed at 100° C., 200° C., 1000° C. and 1300° C. Nearly as soon as heat was applied, the pressure in the system began increasing and the downward thrust in the sample-containing crucible of evolved gas caused an "apparent" weight gain on the TGA curve. This gas evolution is evidenced at the 100° C. and 200° C. portions of the TGA curve.

Figure 2A:
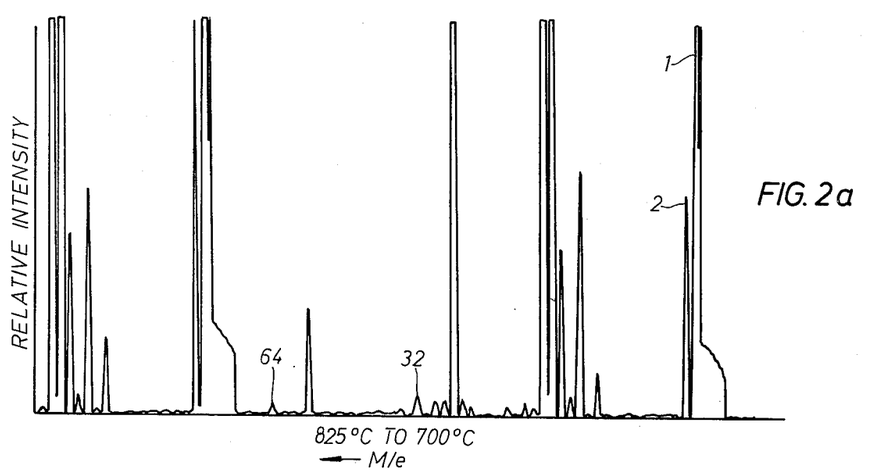
Figure 2B:
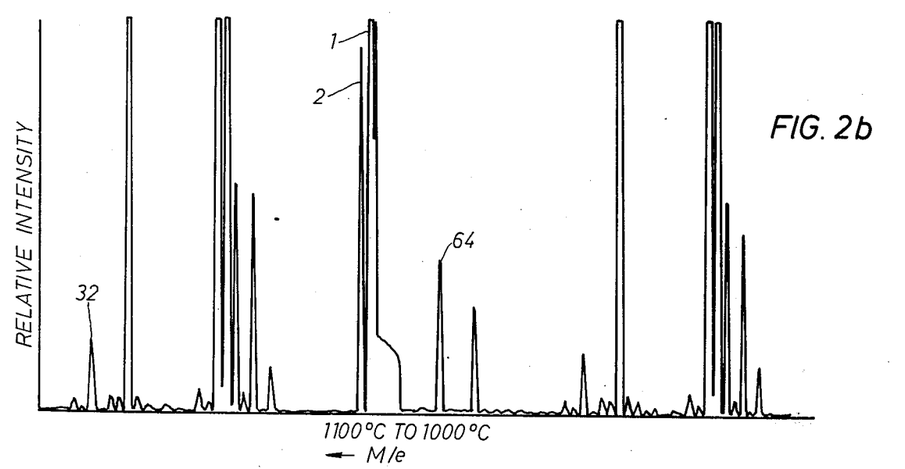
Figure 2C:
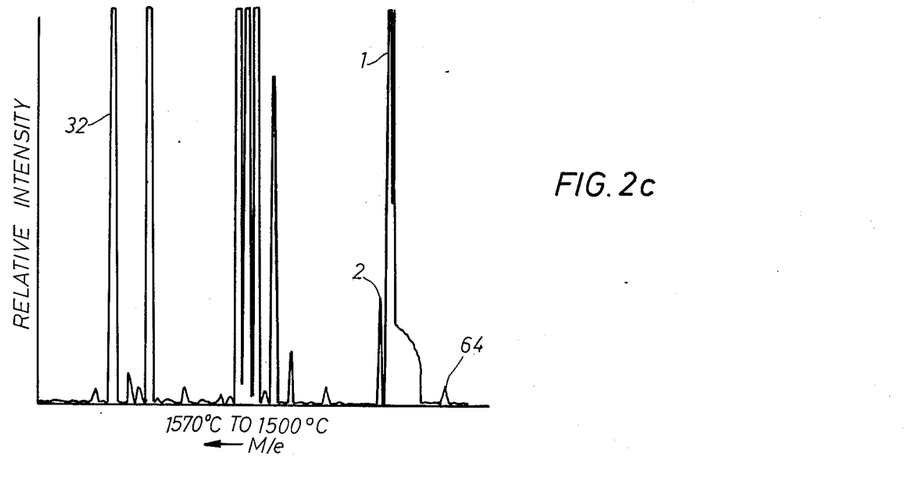
Figure 3A:
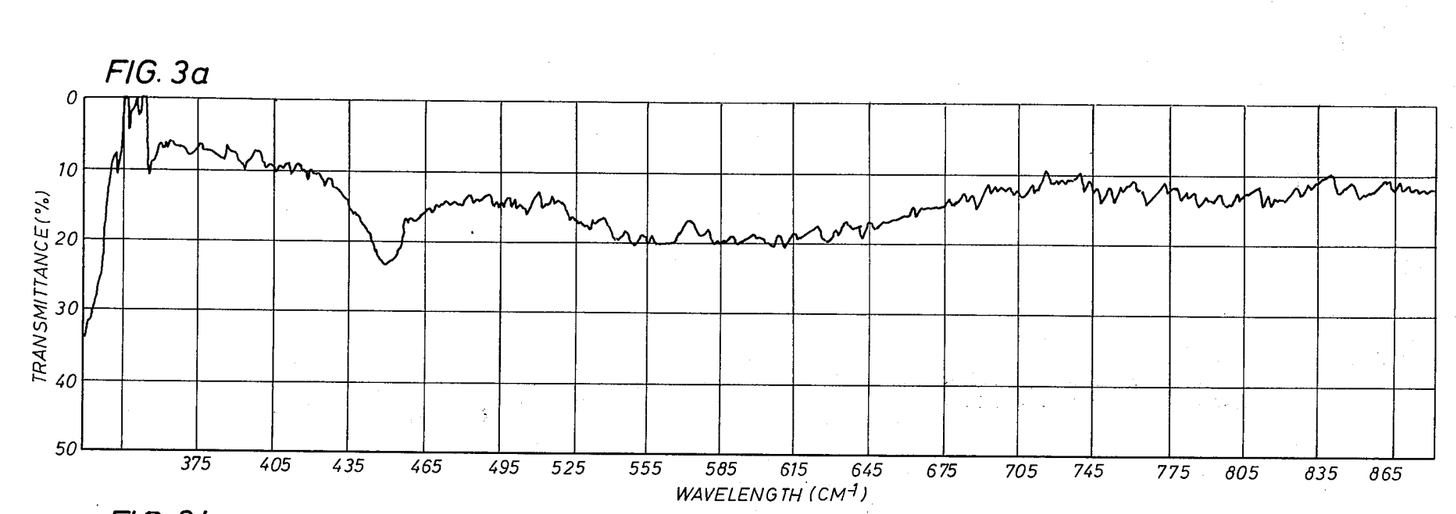
Figure 3B:
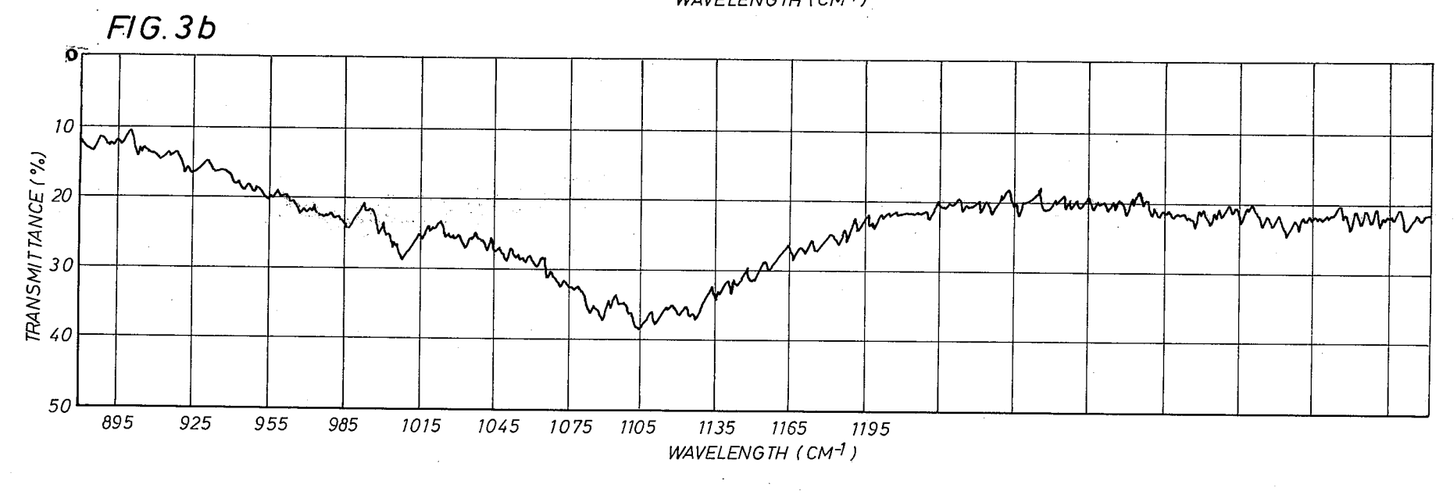
Figure 3C:
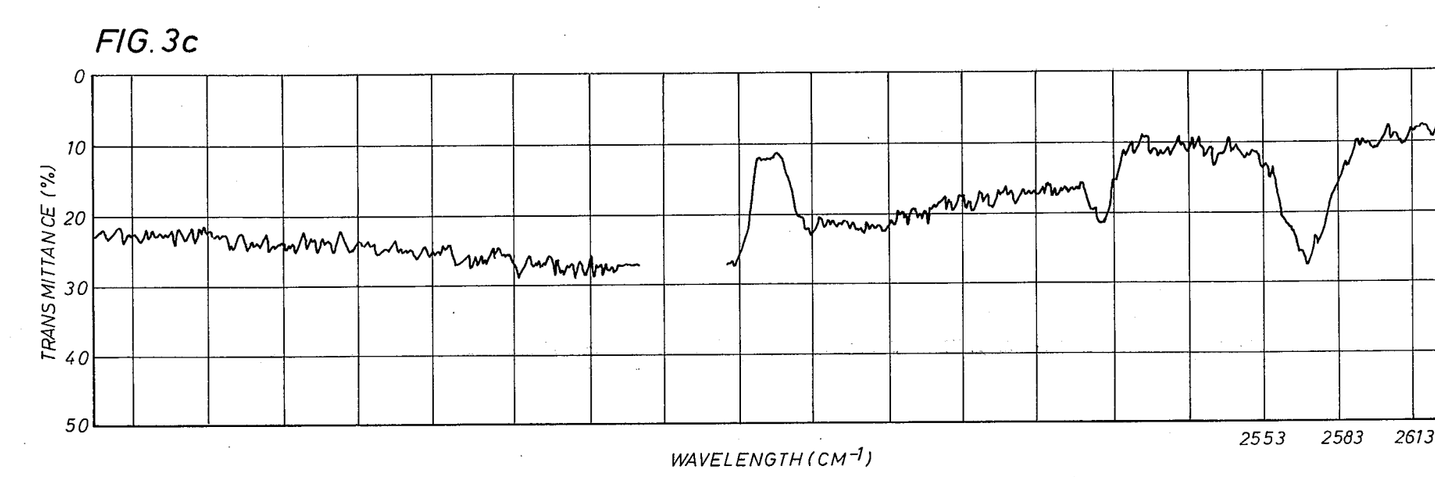
Figure 3D:
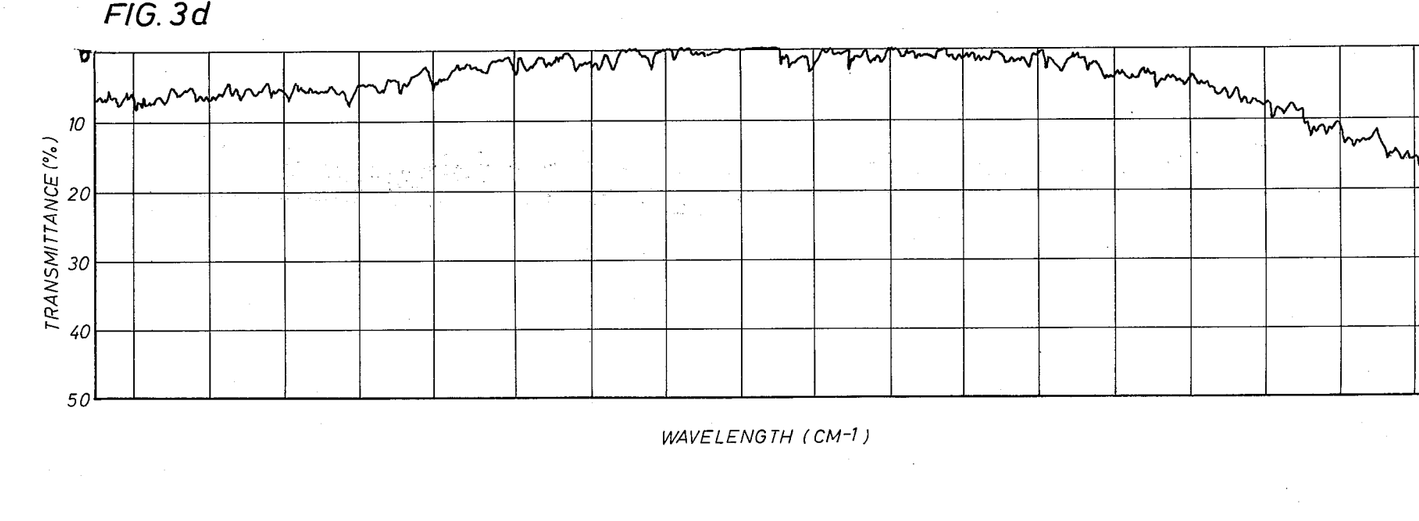

The gases evolved from the sample during the TGA testing were channeled into a mass spectrograph. FIG. 2 depicts portions of the MS chart representing MS scans of 1 to 65 amu, of the gases evolved at 700°-825°, 1000°-1100° and 1500°-1570° C.

Reference to FIG. 2 will clearly show the presence of atomic hydrogen, atomic sulfur, and the S—S bond of the hydrosulfide groups in the inorganic polymeric complex of the present invention. For example, mass 1 identifies the atomic hydrogen present in the system while mass 32 corresponds to atomic sulfur. The presence of these atoms indicates the existence of sulfur-hydrogen bonds. The mass 64 identifies the S—S grouping.

FIGS. 3A-3D depict portions of a Raman spectrograph taken of an inorganic polymeric complex prepared by the present invention. It will be observed that the spectral lines are consistent with the data disclosed at pp. 150-151 of *Inorganic Sulphur Chemistry*, G. Nickless, ed. (Elsevier 1968) for $H_2S_{2-8}$, further indicating the presence within the inorganic polymeric complex of S-H and S—S bonding.

From the above and other analytical data, it has been hypothetically proposed in accordance with the present invention, that the inorganic polymeric complex can be emperically described by the following formula:

[MM'(HS$_n$)$_x$]$_y$ wherein M is the non-alkaline metal; M' is the alkali metal; $n$ is the number of sulfur atoms present in the hydrosulfide group, generally a positive integer up to approximately 14; $x$ corresponds to the number of hydrosulfide groups on each repeating unit of the inorganic polymeric complex, generally believed to ideally correspond to the sum of the valences of M and M" and $y$ corresponds to the number of repeating units in the inorganic polymeric complex, a value not yet quantified. It has been determined, however, in accordance with the present invention that the inorganic polymeric complex has film-forming characteristics. It should be recognized that the above formulation is presented merely as a hypothesis based upon certain analytical data which has been developed in relation to the inorganic polymeric complex. Clearly, the presentation of this hypothetical emperical formula is not meant to in any way limit the scope of the present invention and there is no intention that applicant be bound thereto.

In addition, even under ideal conditions of preparation the aqueous solution of the inorganic polymeric complex may contain some dissolved salts. Furthermore, as indicated previously sulfur may additionally be dissolved in the inorganic polymeric complex and additional SO$_2$ and/or H$_2$S groups may be loaded into the polymer structure. Also, hydroxy groups and/or hydroperoxy groups may be present in the structure of the inorganic polymeric complex depending on the amount of available oxygen present in the system. As a result of this it is quite clear that the inorganic polymeric complex is not capable of precise definition and for this reason, the expression "inorganic polymeric complex" has been used throughout to identify the products produced by the method of the present invention.

Viscosity measurements were performed on two different aluminum-sodium-sulfur complexes to establish the polymeric nature of the complexes. Aqueous sodium chloride solutions of varying concentrations were prepared as a reference for the viscosities of a salt solution.

Figure 4:
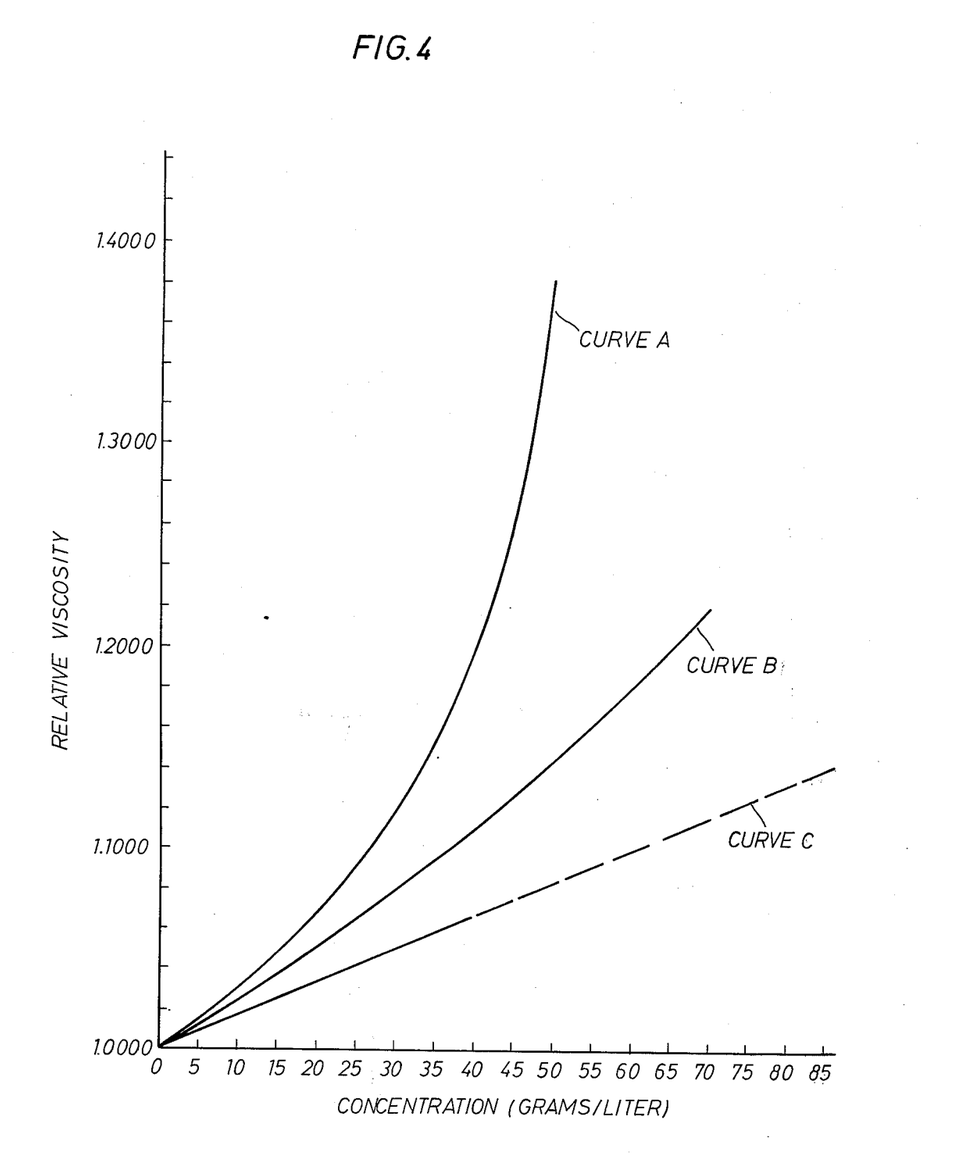
FIG. 4 is a graph of relative viscosities of sodium chloride and an aluminum-sodium-sulfur polymeric complex solution of the present invention.

FIG. 4 is a graph of relative viscosity versus concentration.

Curve A is the graph of inorganic polymeric complex A,

Curve B is the graph of inorganic polymeric complex B, and

Curve C is the graph of sodium chloride.

As is expected, Curve C is a straight line showing the small effect an aqueous salt solution has on water solvent. Curves B and C, however, show that the inorganic polymeric complex dissolved in an aqueous solution has a definite impact on the viscosity of the water solvent. Curve B indicates a low molecular weight polymeric complex whereas Curve C indicates a higher molecular weight polymeric complex.

The present invention will now be described by reference to the following specific examples. It must be recognized that these examples are given only to demonstrate the practice and effectiveness of the invention. These examples are not meant to, and should not be construed to, limit the invention to the specific examples set forth herein. Rather, these examples merely show the results obtainable through the practice of this invention by one skilled in the art.

The parts and percentages recited in the following examples refer to parts by weight and percentages by weight unless specifically provided otherwise.

Figure 6:
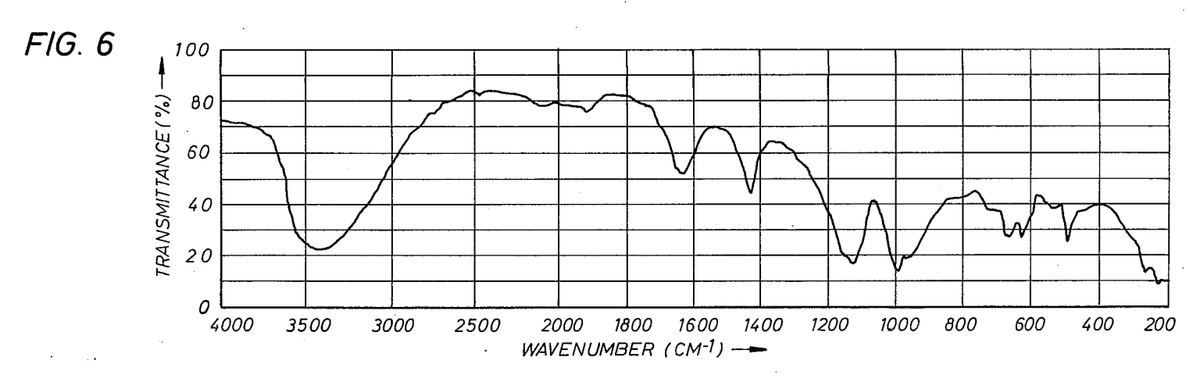
FIG. 6 is an infrared scan of the same aluminum-sodium-sulfur polymeric complex as that of FIG. 3.
Figure 7:
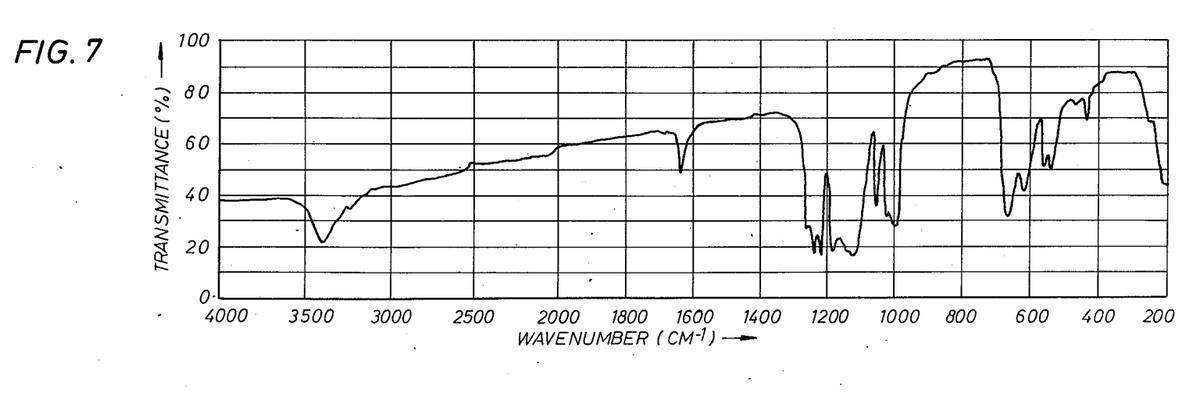
FIG. 7 is an infrared scan of the same aluminum-sodium-sulfur polymeric complex as that of FIG. 4.

In the following examples, reference will be made to the infrared scans of FIGS. 5-7. In connection with the interpretation of such infrared scans, specifically to identify the presence of the hydrosulfide groups reference is made to the following Table 1.

TABLE 1 SO$_4$ — 1100 (s), 575-675 (s) SO$_3$ — 1200 (s), 1050 (m), 625-650 SO$_2$ — 1300 (s), 1150 (s) SO — 1050 (s) SH — 2750-2250 (w), 900-800 (w) 780-680 S, Si, P — 1100-900 (s) S—S —0 425-500 (s), 525 (w) O—H (stretch) — 3200-3700 H$_2$O (bending) — 1600-1650 S—H (stretch) — 2550-2600, 820-905 O—H (deformation) — 1210-1450 O—H (wag) — 850-900 S—S (stretch) — 400-500 S (stretch) — 2290, 2150, 1500-1450

EXAMPLE 1

An inorganic polymeric complex is prepared employing the preferred mixture of hydrogen sulfide and sulfur dioxide gas to provide the necessary source of sulfur for producing reactive hydrosulfide groups and to minimize the formation of oxygen containing groups such as sulfates. In this example, the SO$_2$ and H$_2$S gases are introduced into the reaction medium by using two gas inlet tubes. One tube is connected to the supply source of SO$_2$ and the other to the H$_2$S source. Each tube extends into the reaction solution as close to the reactor bottom as possible such that the respective gases, when introduced, are bubbled through the reaction solution to intimate contact with the non-alkaline metal.

An aluminum/sodium/sulfur inorganic polymeric complex is produced as follows. Some 80 g of sodium hydroxide are dissolved in 720 g of water and the temperature of this solution is brought to 30° C. Thereafter, 219.8 g of aluminum metal in the form of half inch diameter rods approximately ½ - 1 inch long are placed into the sodium hydroxide solution. Immediately prior to the introduction of the aluminum metal, the temperature of the solution is 30° C. and the pH is 14.0. Throughout this example, the temperature range of the reaction solution is maintained between 25° C. to 35° C. by the use of a cooling bath. $SO_2$ and $H_2S$ gas are simultaneously introduced into the reaction solution in a ratio of 1:1 by weight. The total time that this gas mixture is flowed through the reaction solution is 140 minutes. It is observed that 30 minutes after the introduction of the $SO_2/H_2S$ gas mixture, the temperature of the reaction solution is 32° C. and its pH is 13.6. At 70 minutes after the introduction of the gas mixture, the temperature of the reaction solution is 34° C. and its pH is 13.5. At 80 minutes after the introduction of the $SO_2/H_2S$ gas mixture, sulfur particles are observed being formed at the $H_2S$ input tube. These particles float to the surface of the reaction solution whereupon they dissolve. After the $SO_2/H_2S$ gas mixture has been flowing through the reaction solution for 90 minutes, the temperature of the reaction solution is 34° C. and its pH is 13.3, and at this point it is observed that the sulfur particles forming at the $H_2S$ input tube are becoming less soluble in the reaction solution. At 125 minutes after the reaction is commenced, the temperature of the reaction solution is 35° C. and its pH is 12.4. The $SO_2/H_2S$ gas feed is cut off after 140 minutes. The reaction solution temperature is 34° C. at the time of the gas mixture cut-off and the pH is 11.5. The reaction is terminated by removing unreacted aluminum metal from the reaction solution.

Analysis determined that the viscous, transparent solution produced in this example weighed 841.3 g and that 6 g of aluminum were consumed during the reaction. The relatively small amount of aluminum resulted primarily from the fact that at low temperatures the aluminum dissolves slowly in the hydroxide solution. The presence of sulfur particles indicates that the $SO_2$ feed was too great in comparison to this slow rate of dissolution of the aluminum. Had the aluminum metal not been removed, the reaction would have continued with the pH dropping even with the gas mixture cut off.

Nevertheless, the presence of a polymeric complex is indicated by the solution's transparency, viscosity and specific weight. Further, upon filtering and drying, both IR and Raman spectrography confirmed the presence of both SH and S—S bonds. The Raman spectrograph illustrated as FIG. 3 and the IR shown in FIG. 6 of this application were both made from this product. Finally, upon firing the product to 1000° C., a bi-metallic hydrosulfide product in the form of a pink powder resulted. This product readily dissolved in water to re-form a transparent, viscous solution. FIG. 5 of the drawings illustrates an IR spectra taken from an Al—Na polymeric product similar to that made in this example after it had been fired at 1000° C.

EXAMPLE 2

In this example, the effect of high temperature on the ability of the practice of the present invention to form an inorganic polymeric complex is studied. Following the procedure essentially outlined in Example 1 above, 80 g of sodium hydroxide are dissolved in 720 g of water. Thereafter, this sodium hydroxide solution is heated to 100° C. and a pH of 14.0 is measured. The sodium hydroxide solution is introduced into a reaction vessel containing 225.3 g of aluminum. A mixture of $SO_2$ and $H_2S$ gas, 1:1 by weight, is bubbled through the reaction vessel at a flow rate of approximately 0.25 gm/min. for a total of fifty minutes. It is observed that 30 minutes after the introduction of the gas mixture, the temperature of the reaction solution is 99° C. and its pH is 11.5. Throughout this example, no external heating or cooling is applied to the reaction vessel. At 50 minutes after the beginning of the introduction of the $SO_2/H_2S$ gas, the temperature of the reaction solution is 94° C. and its pH is 10.9. At this point, the gas streams are cut off. Throughout this example, no visible sulfur precipitate was formed despite the fact that the gas addition rate was the same as that in the previous example. The reaction was again terminated by removing from the reaction vessel the unreacted aluminum metal.

Analysis showed that 678.7 g of a viscous, transparent solution containing a polymeric complex are produced in this example and that 35.7 g of aluminum are incorporated into the inorganic polymeric complex so formed.

EXAMPLE 3

Following the procedures essentially as described in Examples 1 and 2, 80 g of sodium hydroxide are dissolved in 720 g of water. Thereafter, 220.3 g of aluminum metal are introduced into the sodium hydroxide solution. The temperature range of the reaction solution is maintained between 50° C. to 60° C. The mixture of $SO_2$ and $H_2S$ gas, in the ratio 1:1 by weight, is continuously flowed through the reaction vessel for a total of 80 minutes. It is noted that 35 minutes after the beginning of the introduction of the gas mixture, the temperature of the reaction solution is 55° C. and its pH is 12.7. At 52 minutes after gas flow initiation, the reaction solution is 55° C., its pH is 12.8 and a small amount of visible precipitate is noted forming at the opening of the $SO_2$ input tube. After the gas mixture has been flowing through the reaction vessel for 65 minutes, the temperature of the reaction solution is 58° C. its pH is 12.7 and visible sulfur particles are noted to be redissolving rapidly. At 80 minutes after the beginning of the introduction of the gas mixture, the $SO_2/H_2S$ gas feed is terminated. At this point, the reaction solution temperature is 60° C. and its pH is 12.4. It is observed that the aluminum continues to react with the polymeric complex formed and that the precipitate is no longer visible in the reaction solution. Five minutes after the termination of the gas mixture feed the reaction solution temperature is 66° C. and its pH is 12.3. The reaction is terminated 10 minutes after ending the gas mixture feed by removing the unreacted aluminum from the reaction vessel. A trace amount of precipitate is observed in the reaction vessel.

Analysis shows that the total weight of the solution produced in this example is 815.3 g and that 20.3 g of aluminum metal are incorporated into the polymeric complex formed in this example.

EXAMPLE 4

In this example, the temperature range of the reaction solution is maintained between 40° C. to 50° C. An aqueous solution of sodium hydroxide is prepared by dissolving 80 g of sodium hydroxide in 720 g of water and this solution is then heated to 45° C. Next, 223.8 g of aluminum metal are placed into the aqueous sodium hydroxide solution. A mixture of $SO_2$ and $H_2S$ gas, in the ratio of 2:1 by weight, is flowed through the reaction vessel for 57 minutes. Seventeen minutes after the initiation of the gas mixture flow, the temperature of the reaction solution is 47° C. and its pH is 13.0. After the gas mixture has been flowed through the reaction vessel for 40 minutes, the reaction solution temperature is 50°

C., its pH is 12.9 and a dark gray film partially covering the aluminum metal is observed. Fortyseven minutes after gas feed initiation, the reaction solution temperature is 47° C., its pH is 12.8 and a small amount of precipitate formation is observed at the opening of the SO₂ inlet tube. The gas mixture feed is cut off after 57 minutes. The reaction solution temperature at gas feed cut-off is 50° C. and its pH is 12.6. An increase in precipitate formation is observed. After ceasing the gas feed mixture stream, the aluminum metal continues to react. The reaction is terminated 62 minutes after the beginning of the gas mixture feed by removing the unreacted aluminum from the reaction solution. At this point, the pH of the reaction solution is 12.5 and the precipitate is no longer visible.

Analysis shows that 801.5 g of polymeric complex are produced in this example and 19.3 g of aluminum metal enter into the polymeric complex so formed.

EXAMPLE 5

An aluminum/sodium inorganic polymeric complex is produced as follows. Some 80 g of sodium hydroxide are dissolved in 720 g of water and the temperature of this solution is brought to 71° C. Thereafter, 215.5 g of mercury activated aluminum metal are introduced into the reaction vessel. Immediately prior to the introduction of the mercury activated aluminum metal, the temperature of the solution is 71° C. and the pH is 14.0. The SO₂ gas is introduced into the reaction solution and the total time that this gas mixture is flowed through the reaction solution is 165 minutes. It is observed that 35 minutes after the initiation of the SO₂ feed, the temperature of the reaction solution is 68° C. and its pH is 12.0. At 73 minutes after the initiation of the gas feed, the reaction temperature is 70° C. and its pH is 11.8.

Some 96 minutes after initiation of the gas feed the temperature of the reaction solution is 65° C. and its pH is 11.9. After the reaction has proceeded for 134 minutes, the reaction solution temperature increases to 95° C. and the pH decreases to 11.0. At 156 minutes after the initiation of the gas feed, the reaction solution temperature is 100° C. and its pH is 10.5. After the reaction progresses for 166 minutes, the reaction solution temperature is 103° C., its pH is approximately 7.7. The SO₂ gas stream is cut off at this point.

Analysis shows that the weight of the polymeric complex produced in this example is 533.5 g, 67.9 g of sulfur dioxide enter into the polymeric complex and 8.3 g of aluminum metal have been incorporated into the inorganic polymeric complex so produced.

EXAMPLE 6

In this example, the reaction solution temperature is maintained within a temperature range of 90° C. to 100° C. Some 217.2 g of mercury activated aluminum metal are placed in a reaction vessel containing 760 g of water preheated to 90° C. The SO₂ feed is initiated and 20 minutes thereafter, the temperature of the reaction vessel is 97° C. and its pH is 2.3. At this point in time, the reaction solution color is greenish-yellow. At 35 minutes after initiation of the SO₂ feed, the SO₂ gas is cut off and sodium hydroxide pellets are metered into the reaction solution. It is observed that the reaction solution color changes from greenish-yellow to green upon sodium hydroxide addition. The pH measures 10.5. Additionally, elemental sulfur particles are visible within the reaction solution. The sodium hydroxide feed continues for 11 minutes, at which time the reaction solution temperature is 101° C. and its pH is 11.5. A total of 40 g. of sodium hydroxide are metered into the reaction solution. External heat is applied to the reaction vessel to maintain the reaction solution temperature within the desired temperature range; the activated aluminum metal reacts vigorously in the reaction solution and the elemental sulfur particles go back into solution. A sudsing effect on the surface of the reaction approximating 1 cm in height is noted. At 110 minutes after the introduction of the mercury activated aluminum metal into the reaction vessel, the reaction solution temperature is 93° C. and its pH is 11.0. The reaction is terminated 115 minutes after introduction of the activated aluminum metal. The polymeric complex formed in this example is a transparent, but not water clear, solution with a slightly green tint. A faint odor of hydrogen sulfide emanates from the reaction vessel.

Analysis shows that 568.2 g of polymeric complex are produced in this example and that 15.7 g of aluminum are incorporated into the inorganic polymeric complex so formed.

EXAMPLE 7

754.1 grams of aluminum metal in ⅜ inch diameter rods approximately one inch long and cleaned with NaOH solution are placed in a 20 liter jacketed glass vessel (heated and cooled by circulating water). 4,500 milliliters of deionized water are placed in the reaction vessel and the temperature brought up to 47° C. The lid of the vessel is then closed and a solution of 140 grams of 2.5% NaOH dissolved in 900 milliliters of water is added from the top through a funnel. SO₂ and H₂S gas are then bubbled through the reaction vessel simultaneously from separate sources. The H₂S flow meter is set at 18.5 (corresponding to 0.367 grams per minute) and the SO₂ flow meter set to a reading of 25 (corresponding to 0.846 grams per minute). The pH of the reaction medium is 13.4 at the start of the gas feed and is continuously monitored thereafter at predetermined intervals. The temperature of the reaction begins to increase almost immediately but is maintained below about 65° C. The reaction proceeds according to the following scheme:

| Time Elapsed Hours | Temperature | pH | Remarks |
| --- | --- | --- | --- |
| 0:50 | 62° C | 13.2 | |
| 1:00 | 62° C | 11.4 | yellowish color, white percipitate at bottom |
| 1:15 | | 10.8 | |
| 1:35 | 55° C | 10.0 | |
| 1:50 | 50° C | 8.1 | |
| 2:15 | | 7.0 | |
| 2:25 | | 6.2 | large amounts of precipitate |
| 3:05 | | 2.5 | |

Specific gravity of the product: 1.041

At this point the gas feed is stopped and the unreacted aluminum metal removed from the reaction vessel and weighed. Based upon the weight of the unused aluminum, it is determined that 48.2 grams have been consumed during the reaction. The solution is yellowish in color but is still transparent and has a specific gravity of 1.041. This yellowish color is due to an excess amount of gas feed (particularly H₂S) resulting in a substantial production of elemental sulfur, most of which precipitated, but a substantial portion of which remained suspended in the reaction solution as a colloid. Upon leaving the solution to stand overnight, the yellowish colo disappears almost completely, illustrating the capacity of the polymeric complexes prepared according to the present invention to absorb sulfur. The IR spectra illustrated in FIG. 7 of the attached drawings was taken of this product and whos the S—S bonding. A comparison of the viscosity of the solution prepared according to this example with a sodium chloride solution is illustrated in FIG. 4.

EXAMPLE 8

The procedure of Example 7 is repeated with the exception that twice the amount of NaOH is used. The elapsed time for the reaction to come to completion is approximately twice that of the previous example. The specific gravity of the product is 1.092. The viscosity of this product is also shown on the curve of FIG. 4.

EXAMPLE 9

Run (a) In this study, a molar ratio of silicon to potassium of approximately 1.4:1 is employed in the initial reactants. The reactants are 57.1 grams of silicon metal and 40 grams of potassium hydroxide. Initially, the potassium hydroxide is dissolved in 400 ml. of cold $H_2O$ and heat is applied to this solution until the temperature of the solution reaches 50° C. The initial pH of this aqueous solution is about 12.0. A solution of sulfur dioxide gas is bubbled through the reaction vessel for approximately 37 minutes, after which time the sulfur dioxide stream is shut off. The pH of the solution at this time is about 10.5. The temperature of the reaction system at the time of gas shut off is 44.5° C. The unreacted silicon metal and the solution are then removed to a beaker where the silicon continues to react with the polymeric complex produced. Excess silicon metal is removed when the pH reaches about 7.0.

Run (b) In this study, 60 grams of potassium hydroxide are dissolved in 400 ml. of cold water and heat is applied to raise the temperature of the solution to 50° C. Then 56.5 grams of low purity silicon metal are added to the potassium hydroxide solution. The pH of this solution is 14. Thereafter a stream of sulfur dioxide is bubbled through the reaction vessel for 30 minutes. When the sulfur dioxide stream is cut off, the temperature of the aqueous medium is 45° C. and its pH about 10. Next, the unreacted silicon and the solution are removed to a clean vessel where the reaction of the silicon metal with the polymeric complex produced continues. Excess silicon metal is removed when the pH reaches about 7.0.

Reference to FIG. 4 shows an infrared scan of the inorganic polymeric complex produced in this run.

EXAMPLE 10

Following the procedure essentially as recited in Example 9, studies on the production of an aluminum/potassium/sulfur inorganic polymeric complex are run.

Run (a) In this study, 40 grams of potassium hydroxide are dissolved in 400 ml. of water and the resulting solution heated to 50° C. Then 55.4 grams of low purity aluminum are placed into the potassium hydroxide solution. At this time the pH of the solution is above about 12. Thereafter, a stream of sulfur dioxide is bubbled into the reaction vessel for approximately 71 minutes. The temperature of the reaction medium when the sulfur dioxide stream is shut off is 43° C. and the pH is about 9.0. The unreacted aluminum and the reaction solution are next removed from the reaction vessel and placed in a clean vessel where the aluminum metal continues to react with the polymeric complex produced. Chemical analysis indicates that 6.7 grams of sulfur dioxide enter into the reaction.

Run (b) Sixty grams of potassium hydroxide are dissolved in 400 ml. of water and thereafter 55.1 grams of low purity aluminum are placed into this potassium hydroxide solution. The temperature of the reaction medium prior to the introduction of the sulfur dioxide is 21° C. and its pH is about 14. Sulfur dioxide is then bubbled into the reaction vessel for approximately 41 minutes, after which time the temperature of the reaction vessel is 50° C. After this time the pH of the reaction medium is about 10.5. Both the unreacted aluminum and the reaction solution are removed to another vessel where the reaction of the aluminum metal with the polymeric complex continues. Excess aluminum is removed when the pH reaches 7.0. Chemical analysis indicates that 30.1 grams of sulfur dioxide enter into this reaction.

Figure 5:
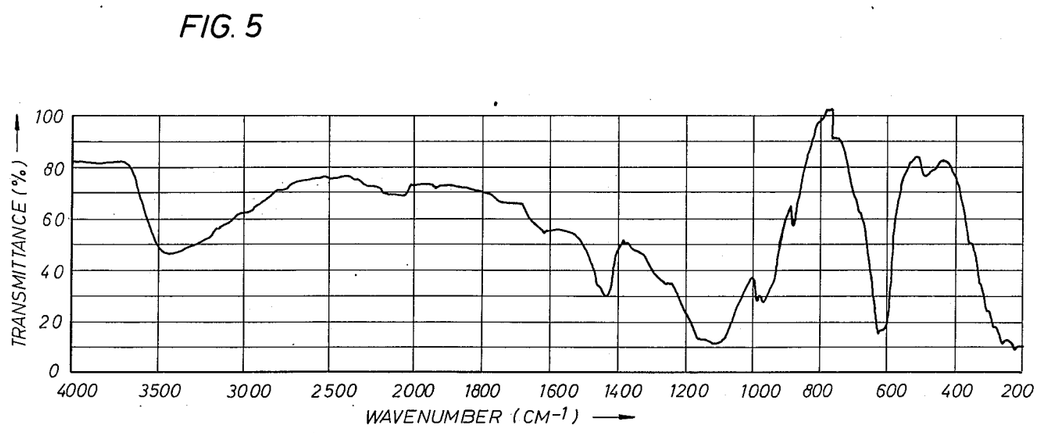
FIG. 5 is an infrared scan of an aluminum-sodium-sulfur polymeric complex produced by the practice of the present invention.

Reference to FIG. 5 shows an infrared scan of the inorganic polymeric complex produced in this run.

EXAMPLE 11

Following the procedure essentially as recited in Examples 1 and 2 above, a titanium/potassium/sulfur inorganic polymeric complex is prepared by dissolving 120 grams of potassium hydroxide in 280 grams of water. Then 96.3 grams of low purity titanium metal are introduced into the reaction vessel. The pH of the reaction medium is about 14. Thereafter a stream of sulfur dioxide is bubbled into the reaction system. The temperature of the solution prior to the introduction of the sulfur dioxide is 60° C. and when the sulfur dioxide feed is cut off, the reaction temperature is 78° C. Sulfur dioxide is fed into the reaction system for 15 minutes and 25.7 grams of sulfur dioxide enter into the reaction. At the conclusion of $SO_2$ feed the pH of the reaction system is about 10.3.

Upon transfer of unreacted titanium and the reaction solution to a clean vessel, it is observed that the reaction of the titanium metal with the polymeric complex continues.

EXAMPLES 12 through 25

In a manner similar to the examples set forth above, polymeric complexes according to the present invention are prepared employing potassium hydroxide and the representative non-alkaline metals from each of Groups I through VIII of the Periodic Table which are set out below. In each instance the reaction product is transparent and soluble in water. The polymeric nature is confirmed by specific gravity and viscosity observations. Upon heating each reaction product, elemental sulfur is precipitated. IR spectrography confirmed the presence of H—S and S—S bonds in each case.

| EX. | | | EX. | | |
|---|---|---|---|---|---|
| | 12. | TiK | | 19. | BeK |
| | 13. | NbK | | 20. | FeK |
| | 14. | MoK | | 21. | NiK |
| | 15. | ZnK | | 22. | NiK |
| | 16. | CuK | | 23. | TaK |
| | 17. | MnK | | 24. | SbK |
| | 18. | CoK | | 25. | TeK |

While the present invention has been described primarily with regard to the foregoing specific exemplification, particularly in connection with the preferred embodiments of the present invention, it should be understood that the present invention cannot under any circumstances be deemed limited thereto, but rather, must be construed as broadly as any and all equivalents thereof. For example, as indicated above, the present invention can make use of a plurality of non-alkaline metals to produce the inorganic polymeric complex and more than one reaction sequence is available to obtain the reaction between the non-alkaline metal or metals, alkali metal hydroxide and sulfur-containing compound. Furthermore, in lieu of utilizing a gaseous sulfur source, such as $SO_2$ and/or $H_2S$, elemental sulfur can be utilized in accordance with the method of the present invention. Accordingly, all of the foregoing must be construed to fall within the scope of the invention disclosed and claimed herein.

What is claimed is:

1. A method of producing an inorganic multi-metal polymeric complex containing a plurality of hydrosulfide groups which comprises:

reacting in an aqueous medium
   (a) at least one non-alkaline metal selected from Groups I-VIII of the Periodic Table;
   (b) an alkali metal hydroxide; and
   (c) an inorganic sulfur containing compound capable of conversion to hydrosulfide groups under the conditions prevailing in the aqueous reaction medium
according to the following:
   (i) introducing a predetermined quantity of said non-alkaline metal into a reaction vessel containing said aqueous medium;
   (ii) providing in said aqueous medium a supply of alkali metal hydroxide to achieve a highly alkaline pH in said aqueous medium;
   (iii) incrementally introducing said sulfur-containing compound into said aqueous medium, whereby said sulfur-containing compound is converted to hydrosulfide groups which react with dissolved metal ions of said non-alkaline metal and alkali metal hydroxide, the rate of the incremented introduction of said sulfur-containing compound corresponding approximately proportionately to the rate of dissolution of the non-alkaline metal, whereby the hydrosulfide groups formed are tied up and bound with the dissolved non-alkaline metal and alkali metal ions, the introduction of said sulfur-containing compound effecting a slow reduction of the pH of said aqueous medium;
   (iv) stopping the incremental introduction of said sulfur-containing compound after some finite reduction in the pH of said aqueous medium, such reduction in pH being indicative of inorganic polymeric complex production; and
   (v) terminating the reaction by removing from the aqueous medium any unreacted non-alkaline metal.

2. A method of producing an inorganic multi-metal polymeric complex containing a plurality of hydrosulfide groups which comprises:

reacting in an aqueous medium
   (a) at least one non-alkaline metal selected from Groups I-VIII of the Periodic Table;
   (b) an alkali metal hydroxide; and
   (c) an inorganic sulfur containing compound capable of conversion to hydrosulfide groups under the conditions prevailing in the aqueous reaction medium
according to the following:
   (i) introducing a predetermined quantity of said non-alkaline metal into a reaction vessel containing said aqueous medium;
   (ii) providing in said aqueous medium a supply of alkali metal hydroxide to achieve a pH of from about 11 to about 14 in said aqueous medium;
   (iii) incrementally introducing said sulfur-containing compound into said aqueous medium, whereby said sulfur-containing compound is converted to hydrosulfide groups which react with dissolved metal ions of said non-alkaline metal and alkali metal hydroxide, the rate of the incremental introduction of said sulfur-containing compound corresponding approximately proportionately to the rate of dissolution of the non-alkaline metal, whereby the hydrosulfide groups formed are tied up and bound with the dissolved non-alkaline metal and alkali metal ions, the introduction of said sulfur-containing compound effecting a slow reduction of the pH of said aqueous medium;
   (iv) stopping the incremental introduction of said sulfur-containing compound when the pH of said aqueous medium reaches a pH of from about 8.5 to about 10.5; and
   (v) removing from the aqueous medium any unreacted non-alkaline metal when the pH of said aqueous medium reaches a pH of about 6.5 to about 7.5.

3. The method of claim 2 wherein said sulfur-containing compound is selected from elemental sulfur, $SO_2$ gas, $H_2S$ gas and mixtures thereof.

4. The method of claim 3 further comprising adding to the aqueous reaction medium elemental sulfur prior to or subsequent to step (v) to increase the sulfur content of the inorganic, multi-metal polymeric complex.

5. The method of claim 2 wherein said sulfur-containing compound is bubbled into said aqueous medium so as to provide contact with said non-alkaline metal.

6. The method of claim 5 wherein said sulfur-containing compound is an $SO_2$ gas.

7. The method of claim 5 wherein said sulfur-containing compound is an $H_2S$ gas.

8. The method of claim 5 wherein said sulfur-containing compound is a mixed $SO_2$ and $H_2S$ gas.

9. The method of claim 2 wherein said aqueous medium is heated to a temperature of at least about 50° C. prior to the incremental introduction of said sulfur-containing compound.

10. The method of claim 2 wherein said non-alkaline metal is aluminum.

11. The method of claim 2 wherein said non-alkaline metal is silicon.

12. The method of claim 2 wherein said alkali metal hydroxide is selected from sodium hydroxide and potassium hydroxide.

13. The inorganic polymeric complex prepared by the method of claim 1.

14. A method of producing an inorganic multi-metal polymeric complex containing a plurality of hydrosulfide groups which comprises:

reacting in an aqueous medium
   (a) at least one non-alkaline metal selected from Groups I-VIII of the Periodic Table;
   (b) an alkali metal hydroxide; and (c) an inorganic sulfur containing compound capable of conversion to hydrosulfide groups under the conditions prevailing in the aqueous reaction medium according to the following:
(i) introducing a predetermined quantity of said non-alkaline metal into a reaction vessel containing said aqueous medium;
(ii) incrementally adding to said aqueous medium a supply of alkali metal hydroxide and incrementally introducing said sulfur-containing compound into said aqueous medium to maintain an acidic pH in said aqueous medium, whereby said sulfur-containing compound is converted to hydrosulfide groups which react with dissolved ions of said non-alkaline metal and alkali metal hydroxide;
(iii) stopping the incremental introduction of said sulfur-containing compound and alkali metal hydroxide after some finite increase in the pH of said aqueous medium, said increase being indicative of inorganic polymeric complex production; and
(iv) terminating the reaction by removing from the aqueous medium any unreacted non-alkaline metal.

15. A method of producing an inorganic multi-metal polymeric complex containing a plurality of hydrosulfide groups which comprises:

reacting in an aqueous medium
(a) at least one non-alkaline metal selected from Groups I-VIII of the Periodic Table;
(b) an alkali metal hydroxide; and
(c) an inorganic sulfur containing compound capable of conversion to hydrosulfide groups under the conditions prevailing in the aqueous reaction medium according to the following:
(i) introducing a predetermined quantity of said non-alkaline metal into a reaction vessel containing said aqueous medium;
(ii) incrementally adding to said aqueous medium a supply of alkali metal hydroxide and incrementally introducing said sulfur-containing compound into said aqueous medium to maintain a pH of from about 2.5 to about 6.0 in said aqueous medium, whereby said sulfurcontaining compound is converted to hydrosulfide groups which react with dissolved ions of said non-alkaline metal and alkali metal hydroxide;
(iii) stopping the incremental introduction of said sulfur-containing compound and alkali metal hydroxide when the pH of said aqueous medium reaches a pH of from about 5.0 to about 6.0; and
(iv) removing from the aqueous medium any unreacted non-alkaline metal when the pH of said aqueous medium reaches a pH of about 6.0 to about 7.0.

16. The method of claim 15 wherein said sulfur-containing compound is selected from elemental sulfur, $SO_2$ gas, $H_2S$ gas and mixtures thereof.

17. The method of claim 16 wherein said sulfur-containing compound is bubbled into said aqueous medium so as to provide contact with said non-alkaline metal.

18. The method of claim 17 wherein said sulfur-containing compound is an $SO_2$ gas.

19. The method of claim 17 wherein said sulfur-containing compound is an $H_2S$ gas.

20. The method of claim 17 wherein said sulfur-containing compound is a mixed $SO_2$ and $H_2S$ gas.

21. The method of claim 15 wherein said aqueous medium is heated to a temperature of at least about 50° C. prior to the incremental introduction of said sulfur-containing compound and alkali metal hydroxide.

22. The method of claim 15 wherein said non-alkaline metal is aluminum.

23. The method of claim 15 wherein said non-alkaline metal is silicon.

24. The method of claim 15 wherein said alkali metal hydroxide is selected from sodium hydroxide and potassium hydroxide.

25. The inorganic polymeric complex prepared by the method of claim 14.

* * * * *